United States Patent [19]

Huu et al.

[11] 4,247,904
[45] Jan. 27, 1981

[54] ADDRESSING UNIT FOR A MICROPROGRAMMED MEMORY

[75] Inventors: Duyet N. Huu; Jean-Claude Ballegeer; Richard Guedj, all of Paris, France

[73] Assignee: Thomson-CSF, Paris, France

[21] Appl. No.: 806,478

[22] Filed: Jun. 14, 1977

[30] Foreign Application Priority Data

Jun. 18, 1976 [FR] France .............................. 76 18599

[51] Int. Cl.³ .............................................. G06F 9/26
[52] U.S. Cl. .................................................. 364/900
[58] Field of Search ... 364/200 MS File, 900 MS File

[56] References Cited

U.S. PATENT DOCUMENTS

| 2,866,177 | 12/1958 | Steele | 364/900 |
|---|---|---|---|
| 3,689,895 | 9/1972 | Kitamura | 364/200 |
| 3,956,738 | 5/1976 | Tessera | 364/200 |
| 4,001,788 | 1/1977 | Patterson et al. | 364/200 |
| 4,025,901 | 5/1977 | Bachman et al. | 364/200 |
| 4,050,058 | 9/1977 | Garlic | 364/200 |

FOREIGN PATENT DOCUMENTS 2254062 12/1974 France .
2284926 9/1975 France .

OTHER PUBLICATIONS

Faix et al., "Increasing the Effective Speed of a Microprogram Store", IBM Tech. Discl. Bull., vol. 16, No. 2, Jul. 1973, pp. 438–440.

Primary Examiner—Gareth D. Shaw
Assistant Examiner—Thomas M. Heckler
Attorney, Agent, or Firm—Cushman, Darby & Cushman

[57] ABSTRACT

An addressing unit for accessing two sequences of instructions quasi-simultaneously, the two sequences of instructions being prerecorded in a single memory. Addresses for the two sequences appear alternately at the address output of the addressing unit at a predetermined clock rate. During a single clock period, the addressing unit receives data for calculating the next address in the first sequence while it is calculating the address of the next instruction in the second sequence. In the following clock period the addressing unit calculates the address of the next instruction in the first sequence while it is receiving data for calculating the address of the next instruction in the second sequence, and so on. In this manner, the unit is simultaneously receiving data for one sequence and calculating an address for the other sequence.

6 Claims, 4 Drawing Figures

ADDRESSING UNIT FOR A MICROPROGRAMMED MEMORY

FIELD OF THE INVENTION

This invention relates to units for calculating and locating the address of microinstructions in the control units of programming memories.

Numerous address calculation units are currently in use, these units being characterized by different modes of address calculation and by more or less long calculation times, these calculation times being fixed or variable.

In certain applications, in particular in the address calculating units of control units intended for numerical coupling systems adapted for coupling a first unit with a second unit, a program sequence is necessary for coordinating the input signals and output signals of each of the two units. For simultaneously treating these two sequences, it is necessary in the control unit to observe fixed address calculation times in order alternately to "serve" the two units or faces of the system. For these applications, it is possible to use two independent addressing units, in which case an external logic circuit enables the two addressing units to be made to function successively in harmony. If the two program sequences use the same memory, additional logic circuits have to be provided in order to guarantee access to the memory by the two addressing units. Systems such as these are onerous and difficult to use.

SUMMARY OF THE INVENTION

The present invention has for its object an addressing unit for a microprogramming memory, containing at least two microprogram sequences relating to two associated or independent "faces", capable of alternately supplying at a fixed frequency the addresses relating to the first face and the addresses relating to the second face in order to satisfy the quasi-simultaneous completion of the two microprogram sequences.

According to the invention there is provided an addressing unit for a microprogrammed memory in which at least two instruction sequences respectively relating to two faces of a data exchange system have been recorded, said addressing unit comprising means for acquiring requisite data for calculating the addresses of said instructions and means for calculating said addresses in dependence upon said acquired data, said acquiring means and said calculating means operating simultaneously and at the same frequency for simultaneously effecting the acquiring of the data for the calculation of an address in one of said two sequences and the calculation of an address in the other of said two sequences, said addressing unit delivering an address for an instruction taken in said microprogrammed memory alternately for each of said sequences at a fixed frequency.

BRIEF DESCRIPTION OF THE DRAWINGS

For a better understanding of the invention and to show how the same may be carried into effect, reference will be made to the following description and the attached drawings, among which.

DESCRIPTION

The central part of a microcomputer always comprises the following elements in various forms:

A central module, known as the arithmetic and logic unit, which effects arithmetic and logic operations and decoding operations. Operands, or addresses of operands (if the operands are stored), and codes designating the nature of the operation to be carried out, are supplied to the inputs of the central module. Its outputs supply, on the one hand, the result of the operation and, on the other hand, condition signals relating either to other circuits within the module modified by the operation or directly to the result of the operation.

A collection of program or microprogram instructions stored in a read-only memory. The execution of each instruction or microinstruction controls inter alia the central module. The progression as a function of time of the executed instructions determines the operation of the unit.

An addressing unit extracting the instructions one by one from the program to have them executed. The progression of the instructions is obtained by a succession of choices which depends on the one hand upon the address and upon the nature of the running instruction, i.e. the instruction in the course of execution (this instruction generally supplying commands for locating the following instruction) and, on the other hand, upon the condition signals obtained at the output of the central module on completion of the operation which has just been executed and, finally, upon conditions which may be imposed on the unit from outside. In order to ensure the progression of the instructions, numerous solutions may be contemplated in relation to the nature of the programs to be executed.

The unit for addressing a programmed memory according to the invention is oriented towards the programs relating to coupling. Instead of controlling location of the instructions of a single sequence, as is normally the case, this unit controls location of the instructions of two program sequences in quasi-simultaneity using partly independent and partly shared circuits, each of these sequences being relative to one of the two units or faces of the system to be coupled.

Figure 1:
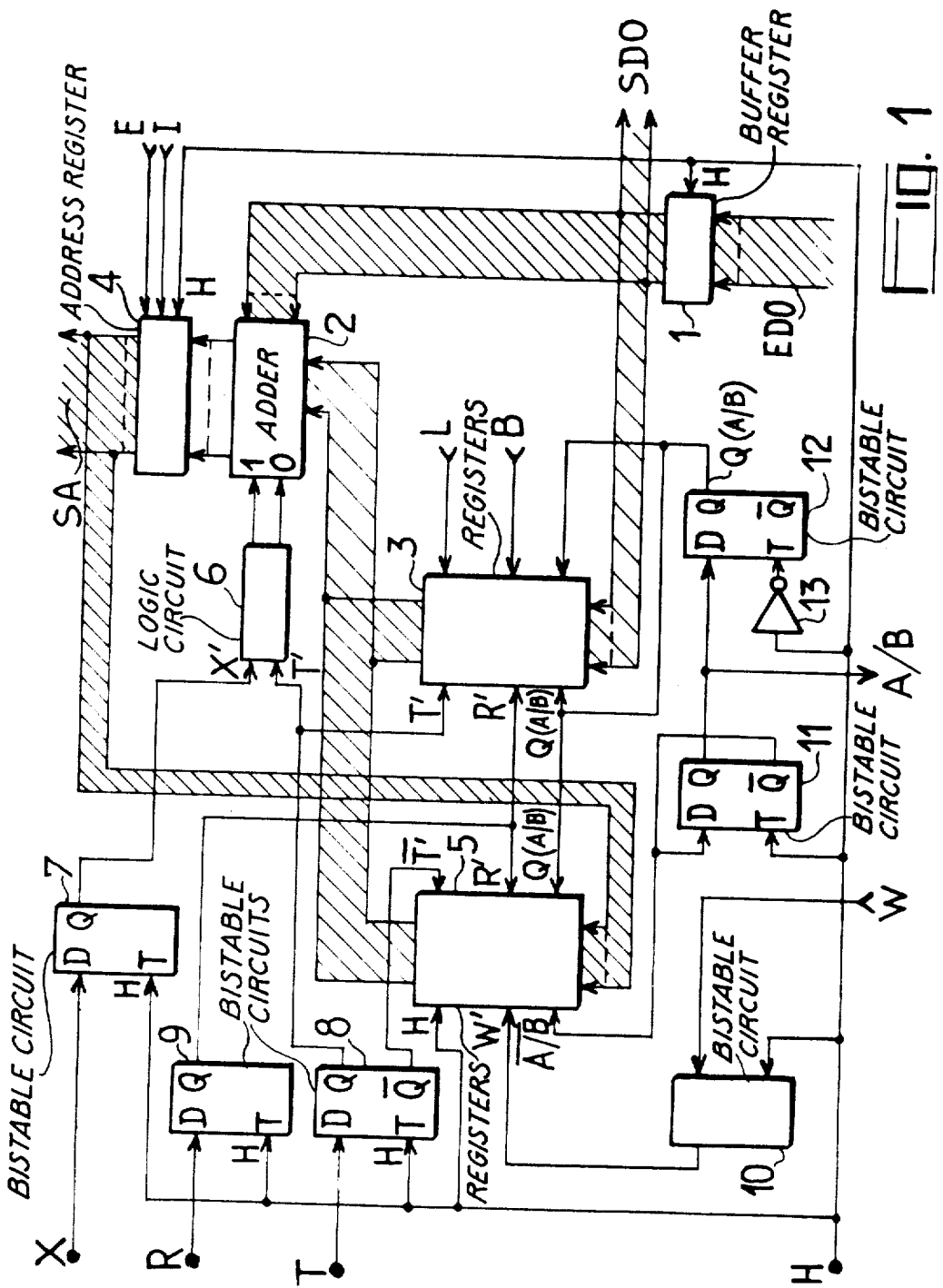
FIG. 1 is a block diagram of the addressing unit according to the invention.

FIG. 1 shows one embodiment of the addressing unit according to the invention.

It comprises a clock input H which determines the rhythm at which the addresses of the different instructions are available at the multiple output SA of the addressing unit. Since the addresses are alternately and at a fixed frequency available at these outputs, as indicated hereinafter, a new address is available every two periods of the clock H for a given face. For a given face, the data and commands necessary for address calculation are present at the various inputs of the unit during a first clock period and, if necessary, are stored, and these data are used for address calculation during the following clock period. There is parallelism between two faces because, during the data acquisition period for one face, the calculation of address relative to the other face is effected and vice versa.

The unit described hereinafter uses at will one or the other of four modes of address calculation which corresponds to four types of possible addressing in the memory:

a simple sequential addressing, in which case the address of one microinstruction is the address of the preceding microinstruction relative to the same face increased by one unit;

an indexed sequential addressing, in which case the address of one microinstruction is the address of the preceding microinstruction relative to the same face increased by a predetermined quantity;

a simple branch addressing, in which case the address of a microinstruction to be located is an item of information supplied to the addressing unit;

an indexed branch addressing, in which case the address of a microinstruction to be located is an item of information supplied to the addressing unit increased by a predetermined quantity.

Other modes of address calculation may be contemplated, in which case the addressing unit described hereinafter will be adapted.

In order to determine the mode of addressing to be effected for each address calculation, the addressing unit has two selection inputs: one input of which the reference is X and another input of which the reference is T. The various combinations of these two inputs lead to the four addressing modes listed above.

The unit additionally comprises an inhibition input I which enables the output lines of the addressing unit to be reset to zero, and an input E which enables the output lines of the unit to be brought to a high impedance level. By this operation, it is possible to eliminate the effect of these lines on all the external lines which they will have been connected in operation and, in particular, on the addressing inputs of the microprogrammed memory. When it is at its inactive level, this normally active command E permits access to the memory by external circuits or by another addressing unit similar to that described.

The addressing unit additionally comprises selection and control inputs for writing and reading the various memory registers of the addressing unit: R, W, B and L. These various inputs and the signals which they receive will be described hereinafter.

Finally, the addressing unit comprises a multiple-connection data input EDO (of the so-called BUS-type) and a multiple-connection data output SDO. The multiple input connection is connected to the input lines of a buffer register 1, whilst the multiple output is directly connected to the output lines of that register. The information contained in the register 1 is available along the output lines of the register 1 during a clock period H, this information being relative to the face of which this clock period corresponds to the address calculation phase. The register 1 has a clock input connected to H and its content is modified on the ascending edges of the clock H. The output bus from the register 1 is connected on the one hand to the multiple input of a first assembly of registers 3 called branch registers and, on the other hand, to a first multiple input of an adder 2. The multiple output of the adder 2 is connected to the multiple input of an address register 4 of which the output bus forms the output of the addressing unit SA. This bus output is connected externally to the addressing input of the microprogrammed memory and inside the addressing unit to the multiple input of a second assembly of registers 5 hereinafter referred to as sequence registers. The multiple outputs of the two register assemblies 3 and 5 are connected to a common multiple connection on which data read in one or other of the two register assemblies are present.

Figure 2:
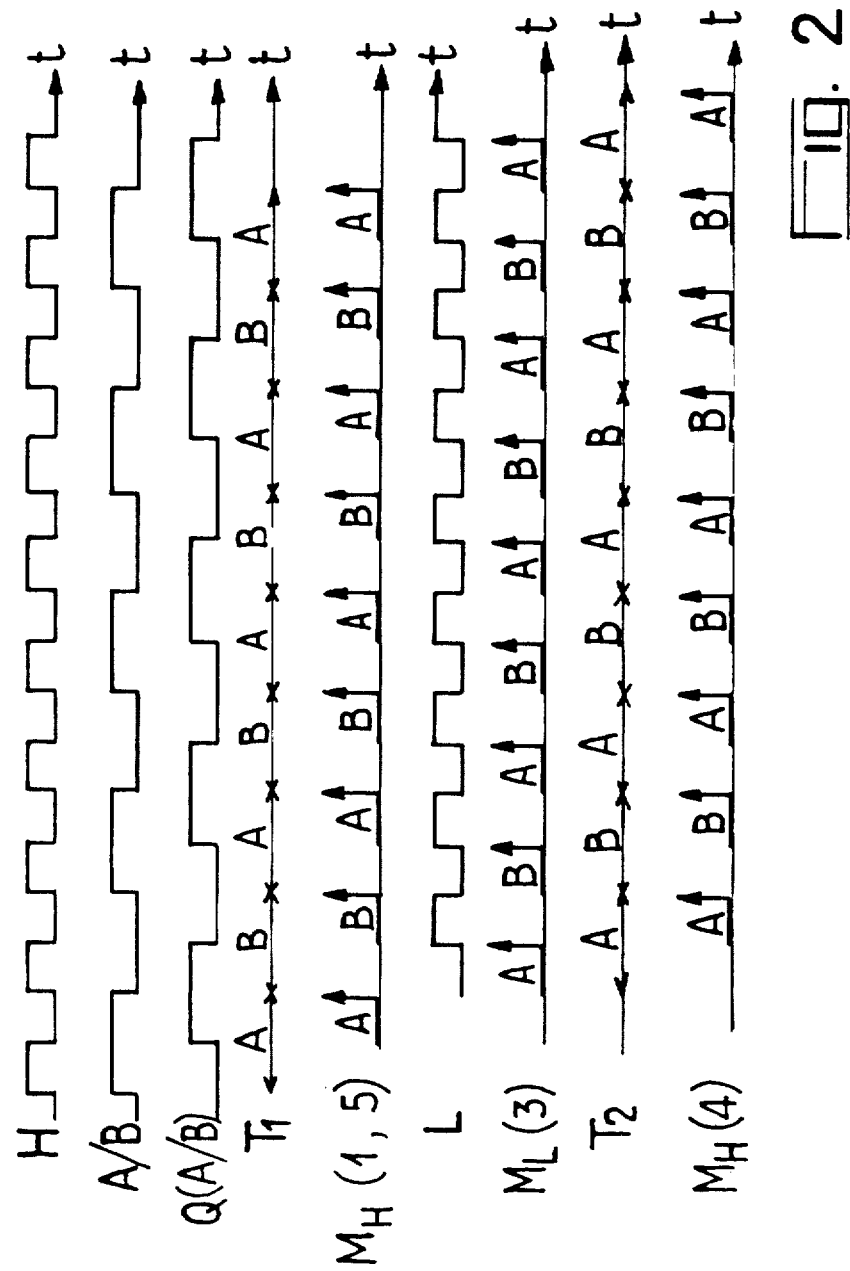
FIG. 2 is a diagram of the timing of the various control signals required for the operation of the unit.

These two assemblies are similar. They each comprise four registers controlled by two writing selection inputs and two reading selection inputs, the combination of the logic signals present at the two selection inputs determining in which of the four registers is to be effected the writing of data present on a multiple input connection connected to the inputs of each of these four registers or the reading of data present in one of these four registers, i.e. their transfer on a multiple output line connected to the multiple outputs of these four registers. These assemblies additionally comprise a writing control input which determines the instants at which the recording is made in one or other of the registers of the assembly, and a reading control input which determines the instants at which one or other of the registers of an assembly is read, the reading of a register in the assembly 3 precluding the reading of a register in the assembly 5 and vice versa. To this end, starting from the clock signal H applied to the clock input of a D-type bistable circuit 11 of which the inverted output $\bar{Q}$ is connected to the input D, the output Q delivers a signal A/B which is a clock signal divided by two, having a period twice that of the clock. This signal is applied to the input D of a bistable circuit 12 of which the clock input receives the clock signal H inverted by an inverter 13. The output signal of this bistable circuit 12 Q (A/B) is thus the signal A/B transmitted with a lag of half a clock period. These various signals are shown in FIG. 2.

The signal A/B determines the phases of acquisition $T_1$ and calculation $T_2$ for the address calculations of the instructions relative successively to the two instruction sequences in conjunction with the two units to be coupled, the letters A and B respectively corresponding to these two units.

The changes of state of the outputs of the register 1 are effected as indicated above on the ascending edges of the clock signal $M_H$, as also is the writing in one of the sequence registers of the address calculated during the calculation phase relating to the same face. The writing in one of the branch registers 3 of data present on the output lines of the register 1 is, if necessary, effected on the ascending edges $M_L$ of the control signal L which, as shown in the diagram, is the clock signal shifted by half a period, but which only exists when it is necessary to write in a branch register.

The writing selection inputs of the sequence registers receive on the one hand the inverted signal A/B which determines the choice of a first group of two registers relative to the face A or the choice of a second group of two registers relative to the face B and, on the other hand, a signal W' which selects the first or the second register of each of these two groups. The signal W' is derived from a signal W applied to the input of the addressing unit at the input of a bistable circuit 10 which transmits the logic level 1 at its output Q when this level appears at the input, the clock pulses applied to the input H enabling the output to be locked. The writing selection inputs of the branch registers receive on the one hand a signal B coming from outside and intended to select the first or the second register of each group and the signal Q (A/B) for selecting one or other of the two groups, depending upon the face regarded. For reading the two assemblies 3 and 5, the command R' is applied to a first selection input. The signal is supplied by the output Q of a D-type bistable circuit 9 which receives the signal R at its input D and the signal H at its clock input. The signal R' enables the first or second register of each group to be selected. The second selection input receives the signal Q (A/B) and determines the selection of one or other of the two groups. The reading instants are determined by the reading command input: the reading command input of the assembly of sequence registers 5 receives the sampled inverted test signal T' derived from the test signal T by means of a D-type bistable circuit 8 which, on the other hand, receives the clock signal; the reading command input of the assembly of branch registers 3 receives the sampled test signal T'. At any given moment, therefore, the reading command only acts on one of the two assemblies of registers 3 and 5.

The multiple output connection common to the two memory assemblies 3 and 5 is connected to the second multiple input of the adder 2. This adder further comprises two forcing inputs which respectively force the first multiple input of the adder to 1 and to 0 when they are activated. These two inputs are connected to the two outputs of a logic circuit 6 which respectively receives the signals T' and X' at its two inputs. The combination X'=0, T'=0 causes the forcing-to-1 input to be activated whilst the combination X'=0, T'=1 causes the forcing-to-0 input to be activated, these two combinations respectively corresponding to a simple sequential addressing and to a simple branch addressing.

The availability of two branch or sequence registers for each of the two faces is essential if the address calculation unit is to be able to store the elements necessary for the completion of a principal instruction sequence whilst at the same time controlling the completion of a secondary instruction sequence relating to the same face.

Figure 3:
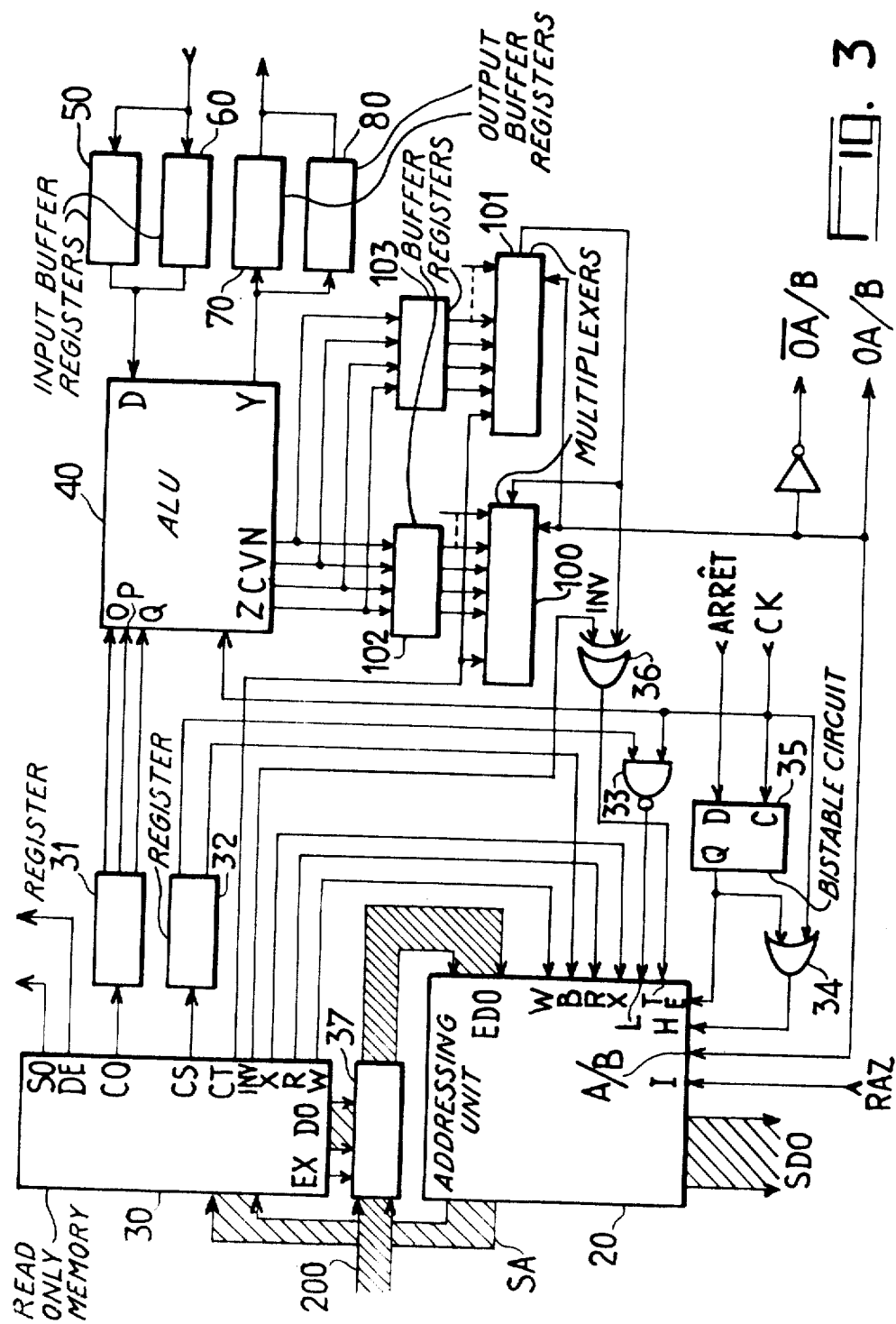
FIG. 3 is a synoptic block diagram of a programmed data processing unit using an addressing unit according to the invention.

FIG. 3 is a synoptic block diagram of a processing unit intended for the transfer of data emanating from a data source belonging to a first or a second face to one or more receivers, i.e. to one or more units capable of exploiting them which themselves belong to a first or a second face. In this application, all the data circulate on an external connection. Each element of the system connected to this external connection may be in turn source and receiver, including the addressing unit and the arithmetic and logic unit. With each instruction, the external connection receives a value from a single source.

An arrangement such as this comprises an addressing unit 20 similar to that described with reference to FIG. 1. The output address bus line of this unit is connected to the address input of a read-only memory 30 in which have been stored two instruction sequences relating to the two external faces A and B to be coupled and an arithmetic and logic unit 40 comprising a part reserved for the actual calculation, a local memory and a local register. The local memory delivers two operands to the calculation unit of the arithmetic unit whilst the local register delivers a third operand. Finally, another operand may be delivered to the arithmetic and logic unit by the input D emanating from an external source.

With each instruction, two of the four possible operands are selected, the destination of the result obtained after the operation is also specified in the same way as the operation itself. This triple selection is effected by the three command inputs O, P and Q.

The arithmetic and logic unit 40 communicates with the elements of the system connected to the external connection by the inputs D and the outputs Y by way of input buffer registers 50 and 60 respectively relating to the faces A and B by way of output buffer registers 70 and 80 respectively relating to the faces A and B. In addition, the arithmetic and logic unit supplies four condition signals at its outputs Z, C, V and N characteristic of the operation which has just been effected. A signal of level 1 at the output Z indicates that the result of the operation wihch has just been effected is zero, at the output C that there is a carryover, at the output V that the value obtained is too great and that it has exceeded the capacity of the unit and at the output N that the result of the operation is a negative number. The external connection to which the source and receiver elements are connected is directly controlled by control signals SO and DE emanating from the read-only memory 30 which are respectively intended for the selection of the source element and the receiver elements for executing each data-transfer instruction. The read-only memory is connected to the arithmetic and logic unit and to the external circuits by an instruction register consisting of a first register 31 which is loaded with a first part of the microinstruction called the field operation and hereinafter denoted DO, and which delivers the selection signals O, P and Q to the arithmetic unit, and of a second register 32 which is loaded with another part of the microinstruction called the selection field and hereinafter denoted CS which is intended for the writing selection of the branch registers of the addressing unit 20. To this end, a first output of the register 32 is connected to the input B of the addressing unit and the other output of this same register is connected to the input L of this same unit by way of a NAND-gate 33 which at its second input receives the clock signal CK of the assembly; this clock signal CK is also applied to the clock input H of the addressing unit by way of an OR-gate 34 which at its second input receives the output signal of a D-type bistable circuit 35 which itself receives a stop signal at its input D and the signal CK at its clock input. The output signal of this bistable circuit is also applied to the input E of the addressing unit.

Another part of the microinstruction issuing directly from the read only memory is intended for the commands W, R, X and T of the addressing unit. To this end, four outputs are provided on the memory, these four outputs being respectively connected directly to the input W, to the input X, to the input R and, through an exclusive-OR-gate 36, to the input T of the addressing unit for inversion of the test. These outputs having the same references as the corresponding input, except the last one which is "INV". The second input of the gate 36 receives the output signal of one or other of the multiplexers 100 and 101 respectively relating to the faces A and B, this signal being the signal to be tested. The possibility of inversion of the test enables the programming flexibility of the coupling arrangement to be increased. The multiplexers 100 and 101 are connected to an output of the memory delivering another field of each recorded microinstruction relating to the test called the field test, CT. They also receive the signal A/B emanating from the addressing unit and selecting one or other of the two multiplexers according to the face affected by the microinstruction read. Accordingly, one of n possible signals is thus selected for transmission to the addressing unit to be tested there. The signals capable of being tested include the condition signals Z, C, V, N transmitted to the multiplexers 100 and 101 by way of two buffer registers 102 and 103, respectively, and other signals which emanate from outside the system and which may therefore be taken into consideration. The registers 102 and 103 store the condition signals emanating from the arithmetic and logic unit alternately for each face. The signals thus stored after the execution of a microinstruction are capable of being tested by the following microinstruction. A multiplexer 37 of which the multiple output is connected to the data input of the addressing unit receives a field of the microinstruction called DO emanating directly from the read-only memory 30 and data taken from the external multiple connection 200. The choice between one or other of these two values is made by a control signal which itself emanates from the microinstruction, a field EX of one bit of this microinstruction being reserved for this purpose.

In addition, the multiple data output of the addressing unit is itself connected to the external multiple connection. The addressing unit is thus capable of exchanging data in both directions with the other elements of the system. It is thus capable of acting as source or receiver in the same way as the other elements of the system.

The structure of a microinstruction recorded in the memory 40 is as follows:

| SO | DE | CO | DS | CT | W | R | X | R | INV | DO | EX |
|----|----|----|----|----|---|---|---|---|-----|----|----| and may be summarised as follows:

SO is the field intended for selecting a source for transfer via the external multiple connection.

DE is the field intended for selecting the receivers for transfer via the external multiple connection.

CO is the operation field intended for selecting the operands and the operation.

DS is the field intended for the writing selection command of the branch registers of the addressing unit.

W, X, R, INV are other commands intended for the addressing unit.

DO is the value optionally used by the addressing unit as absolute branch address or as index value for an indexed addressing.

EX is a binary element which determines if the multiple data input of the addressing unit is to receive its value from the external multiple connection or from the control memory (value EDO).

In this application, the addressing unit calculates the address of a microinstruction to be located in the control memory 30. With each clock cycle, a microinstruction present in this memory is read alternately for the face A and for the face B. The following cycle then provides on the one hand for execution of the corresponding instruction in the arithmetic and logic unit 40 and on the other hand for acknowledgement in the addressing unit of the data which can be used for calculating the following address relating to the same face.

Parallel to execution for one face reading is carried out for the other face.

The transfers of data on the external multiple connection are effected at the same time as the transfers of the fields required for reading exactly at the end of the acquisition cycle. At this instant, all the outputs of the memory towards the arithmetic and logic unit and towards the addressing unit are ready for the execution which follows immediately.

Figure 4:
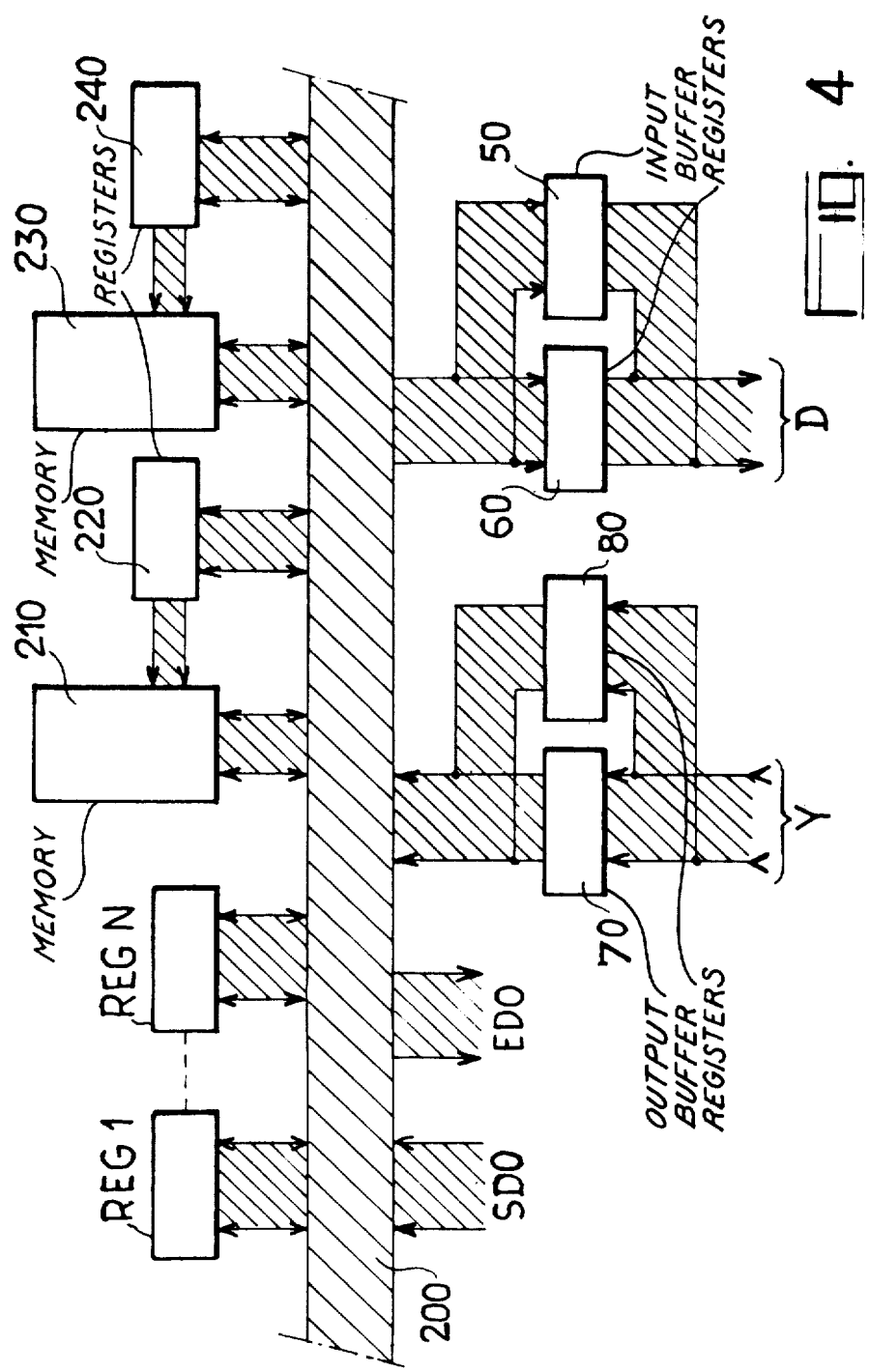
FIG. 4 is an explanatory diagram.

The external multiple connection 200 and a certain number of elements of the system connected to it are shown in FIG. 4.

REG 1 ... REG N are either data registers or external peripheral registers or even so-called "postbox" registers. They are capable of supplying data to the external connection or of receiving data therefrom. 210 and 230 are memories respectively assigned to the two faces A and B. The address of the bit to be read or the address at which a bit is to be recorded in each of these memories is supplied respectively by one or other of the two access registers 220 and 240 of the memories A and B, the content of these registers being able to be read on the bus line 200 or to be supplied to that bus line. In addition, this external connection line is connected to the data input of the addressing unit EDO and to its output SDO. In addition, this FIG. 4 shows the input D and the output Y of the arithmetic and logic unit and also the input buffer registers 50 and 60 and the output buffer registers 70 and 80. Other elements may also be connected to this external multiple connection to form a complete system.

One simple example of application of the system is the operation which consists in reading the data contained in the register REG 1 and in storing them at the address indicated in the local memory of the arithmetic and logic unit of address 0. This operation may use checks of the data received, a check being obtained by adding the stored value to the content of the local memory of address 1. Finally, it is then necessary to update the local memory of address 0 by adding 1 to it and to test its value to determine whether the allocated memory zone has been filled by the last writing. This succession of operations necessitates three microinstructions which perform elementary operations. Each microinstruction is obtained by selecting the adapted values of each of the fields of the microinstruction which may be used for the corresponding elementary operation.

Accordingly, the time required for this operation comprises three cycles, each of these cycles comprising a data acquisition phase for the addressing unit which, at the same time, is the reading phase of the instruction for the system (in particular for the arithmetic and logic unit) and a calculation phase for the following address which, at the same time, is an execution phase of the microinstruction for the system. It is possible at the same time to carry out a sequence of instructions relating to the other face, the acquisition phase and reading phase for the face A simultaneously being a calculation phase for the following address for the face B and an execution phase for an instruction relating to this same face and vice versa.

The invention is not limited to the embodiment of the addressing unit described and illustrated. In particular, as indicated above, it is possible to provide other modes of addressing the memory, for example by increasing the number of branch and sequence registers for each face, the selection signals being of course adapted to the number of registers.

This unit may be included in a microprocessor for advantageously replacing a conventional program counter and its accessary parts (columns of addresses of sub-programs) when the microprocessor is used for coupling two faces A and B of a system, each having a certain number of constraints adapted to be taken into account and capable of being translated by a sequence of instructions.

What we claim is:

1. An addressing unit for use with a microprogrammed memory in which first and second instruction sequences have been recorded; each instruction sequence including at least first and second instructions, each instruction including a data field including data specifying the address of the next instruction to be executed, said first and second sequences respectively relating to the exchange of data from a first unit to a second unit of a data processing system and from the second unit to the first unit of the data processing system, said addressing unit comprising:

a first means for addressing said instructions of said sequences, said addressing means addressing said first instruction of said first sequence;

second means for reading said instructions of said sequences from said memory, said reading means reading said first instruction of said first sequence;

third means for storing the data from the data field associated with said instructions the data from said data field for use in calculating the address of the next instruction to be executed, said storing means storing the data from the data field associated with said first instruction for use in calculating the address of the next instruction to be executed, the next instruction belonging to said second sequence;

a single calculating circuit for receiving data from said data field of said first instruction including data specifying the address of the next instruction to be executed and calculating from said data the address of the next instruction to be addressed and read, and supplying said calculated address to said means for addressing, said next instruction belonging to the second sequence, said single calculating circuit and the combination of said first, second, and third means operating simultaneously and at the same clock rate and both alternately, from one clock period to the next, respectively on the first and on the second of said two sequences and then vice versa at a fixed clock rate.

2. An addressing unit for use with a microprogrammed memory as claimed in claim 1, wherein said third means comprises for each of said first and second sequences, storing means for storing data from a data field at said fixed clock rate, and wherein said single calculating circuit comprises a single adder and logic means controlled at the same fixed clock rate, said logic means alternately extracting data from one and the other of said storing means according to whether the calculation of said address concerns an instruction to be addressed and read belonging to the first or second sequence.

3. An addressing unit for a microprogrammed memory as claimed in claim 2, wherein each of said storing means contains two sets of registers, the data from each field of said two recorded instruction sequences being able to be written into one or other set of registers, each of said first and second instruction sequences being accessed independently of the other.

4. An addressing unit for a microprogrammed memory as claimed in claim 3, wherein each of said storing means comprises two sequence registers for storing successive addresses calculated by said single calculating circuit, said addresses relating to instructions to be addressed and read belonging respectively to said first and second instruction sequences, and two branch registers for storing data emanating from outside said addressing unit.

5. An addressing unit for a microprogrammed memory as claimed in claim 4 wherein said addressing can be effected according to one of several addressing modes, wherein said combination of said first, second, and third means and said single calculating circuit further comprise selection inputs for selecting, according to the addressing mode, one of said storing means and one of said registers intended for storing external data on the one hand and one of said storing means and one of said registers read for the calculation of an address on the other hand, the various combinations of signals present at said selection inputs being derived from predetermined fields of a previously addressed and read instruction and determining said one addressing mode to be effected.

6. An addressing unit for a microprogrammed memory as claimed in claim 5, wherein said possible addressing modes of said memory are a simple sequential addressing, an indexed sequential addressing obtained from the address of the preceding instruction corresponding to the same sequence stored in one of said sequence registers, a simple branch addressing and an indexed branch addressing obtained from a branch address stored in one of said branch registers.

* * * * *